United States Patent [19]

Nishikawa et al.

[11] Patent Number: 5,051,318

[45] Date of Patent: Sep. 24, 1991

[54] MAGNETIC RECORDING MEDIUM CONTAINING AN ORGANIC SILICONE COMPOUND HAVING BRANCHED CHAW SATURATED HYDROCARBON GROUPS

[75] Inventors: Yasuo Nishikawa; Tsutomu Okita, both of Kanagawa, Japan

[73] Assignee: Fuji Photo Film Co., Ltd., Kanagawa, Japan

[21] Appl. No.: 423,289

[22] Filed: Oct. 18, 1999

[30] Foreign Application Priority Data

Oct. 18, 1988 [JP] Japan .................................. 63-260502

[51] Int. Cl.$^5$ ............................................... G11B 23/00
[52] U.S. Cl. ..................................... 428/692; 428/694; 428/900; 428/447; 252/62.54; 252/49.6
[58] Field of Search ............... 428/900, 694, 695, 447; 252/62.54, 49.6

[56] References Cited

U.S. PATENT DOCUMENTS 4,135,016  1/1979  Ogawa et al. ......................... 428/64
4,369,230  1/1983  Kimura et al. ...................... 428/421

Primary Examiner—Merrell C. Cashion, Jr.
Assistant Examiner—Stevan A. Resan
Attorney, Agent, or Firm—Sughrue, Mion, Zinn Macpeak & Seas

[57] ABSTRACT

A magnetic recording medium is disclosed, which comprises a non-magnetic support having thereon a magnetic layer comprising ferromagnetic particles dispersed in a binder, said magnetic layer containing an organic silicone compound modified with a branched chain saturated fatty acid, and represented by formula (I):

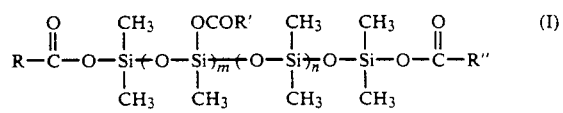

wherein R, R', and R" each represents a branched chain saturated hydrocarbon group having 7 to 24 carbon atoms; m represents an integer of 1 to 100; n represents an integer of 0 to 250; $m+n \leq 300$; and $m \geq n/5$.

8 Claims, No Drawings

MAGNETIC RECORDING MEDIUM CONTAINING AN ORGANIC SILICONE COMPOUND HAVING BRANCHED CHAW SATURATED HYDROCARBON GROUPS

FIELD OF THE INVENTION

The present invention relates to a magnetic recording medium comprising a non-magnetic support having thereon a magnetic layer comprising ferromagnetic particles dispersed in a binder, and more particularly it relates to a magnetic recording medium for higher density recording having an excellent running property and durability under the circumstances of a wide range of temperature and humidity.

BACKGROUND OF THE INVENTION

Recently, there has been a growing demand for higher density recording. To meet such demand, it is known to smooth the surface of a magnetic layer. However, when a surface of a magnetic layer is made smooth, the friction coefficient between a magnetic layer and a magnetic head is increased while the magnetic recording medium is running. As a result, the magnetic layer of the magnetic recording medium tends to be damaged or to be peeled off in a short period of time.

To overcome the above problems, there have been used in recording media lubricating agents such as fatty acids, fatty acid esters, hydrocarbons, or silicone compounds, etc.

As a device for driving a flexible disk, for example, such as a home VTR (video tape recorder), a personal computer or a word processor is widely used, a magnetic recording medium comes to be driven under a variety of conditions, including low temperature, or high temperature and high humidity. To this end, a magnetic recording medium should be stable so that its running durability does not fluctuate under various expected conditions. However, conventional lubricating agents are not sufficient to overcome the above problems.

Silicone compounds have been used to solve the above problems by taking advantage of their specific ability to improve a surface property and their excellent fluidity.

As silicone compounds, JP-B-49-14249 (the term "JP-B" as used herein means an "examined Japanese patent publication") describes the following compounds represented by formula (II), and JP-A-50-32904 (the term "JP-A" as used herein means an "unexamined published Japanese patent application") describes the following compounds represented by formula (III).

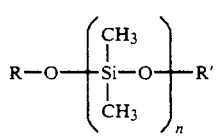

(wherein R and R' each represents a hydrocarbon group having 7 to 26 carbon atoms; and n represents an integer of 1 to 20)

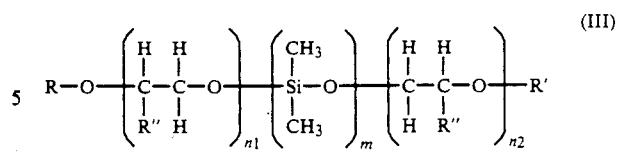

(wherein R and R' each represents a hydrocarbon group having 8 to 18 carbon atoms; R'' represents a hydrogen atom or a methyl group; $15 \geq m \geq 1$; and $16 \geq (n_1 + n_2) \geq 2$)

However, the compounds of formula (II) are undesirable because durability is not improved, and compatibility with a binder is low, thereby causing blooming. It is thought that this is because hydrocarbon groups are attached to silicon atoms by an ether linkage having a small polarity.

The compounds of formula (III) are undesirable because the dynamic friction coefficient between the magnetic recording medium containing said compounds and the magnetic head of a VTR is increased under high loads, thereby causing creaking while the magnetic recording medium is in contact with the magnetic head. Also, the durability is hardly improved. This may be attributed to the presence of a hydrophilic alkylene oxide chain in the molecule.

To overcome the above problems, JP-B-56-26890 proposes a magnetic recording medium comprising a nonmagnetic support having thereon a magnetic layer comprising ferromagnetic particles dispersed in a binder, said magnetic layer containing an organic silicon compound represented by formula (IV):

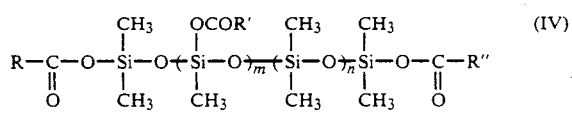

wherein R, R', and R'' each represents a saturated or unsaturated hydrocarbon group having 7 to 21 carbon atoms; m represents an integer of 1 to 100; n represents an integer of 0 to 250; $m + n \leq 300$; and $m \geq n/5$.

JP-B-56-26890 states that stable running property, good wear resistance and good durability are obtainable, and also blooming phenomenon is widely improved.

However, when such organic silicone compounds are those modified with a straight chain saturated fatty acid, melting point (softening point) increases, thereby lowering lubricating effect at low temperature. On the other hand, when such organic silicone compounds are those modified with a straight chain unsaturated fatty acid, though they have excellent fluidity, they are undesirable because static friction coefficient is increased when they are applied to magnetic recording mediums for high density recording having a smooth surface.

SUMMARY OF THE INVENTION

An object of the present invention is to provide a magnetic recording medium which can solve the conventional problems noted above.

Another object of the present invention is to provide a magnetic recording medium for high density recording having excellent lubricating property and improved running durability.

The present inventors have attempted to overcome the above problems and have consequently found that when an organic silicone compound modified with a branched saturated fatty acid and represented by the following formula (I) is used as a lubricating agent, remarkably excellent results can be obtained.

Namely, the present invention provides a magnetic recording medium comprising a non-magnetic support having thereon a magnetic layer comprising ferromagnetic particles dispersed in a binder, said magnetic layer containing an organic silicone compound modified with a branched chain saturated fatty acid, and represented by formula (I):

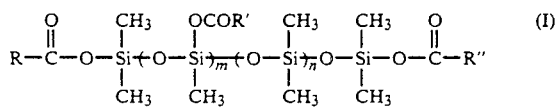

wherein R, R', and R" each represents a branched chain saturated hydrocarbon group having 7 to 24 carbon atoms; m represents an integer of 1 to 100; n represents an integer of 0 to 250; $m+n \leq 300$; and $m \geq n/5$.

Even if magnetic recording mediums suited for high density recording and having a smooth surface are used under severe conditions such as at high temperatures and high humidities, or at low temperatures and low humidities, stable running durability can always be insured by using a magnetic layer which has organic silicone compound represented by the above formula (I) therein or thereon.

The preferred embodiments of the present invention are as follows:

(1) A magnetic recording medium in which the organic silicone compound represented by formula (I) is present in an amount of 0.1 to 5 parts by weight per 100 parts by weight of the ferromagnetic particles.

(2) A magnetic recording medium in which the binder contained in the magnetic layer is present in an amount of 10 to 70 parts by weight per 100 parts by weight of the ferromagnetic particles.

DETAILED DESCRIPTION OF THE INVENTION

The lubricating agent used in the present invention is an organic silicone compound subjected to modification (acylation) with a branched chain saturated higher fatty acid having a particular range of carbon number which can be selected from those having a wide range of molecular weight, regardless of the branched chain structure.

R, R', and R" are preferably a saturated hydrocarbon group having 13 to 21 carbon atoms. Examples of R, R', and R" include —CH($C_6H_{13}$)$C_8H_{17}$, —CH($C_7H_{15}$)$C_9H_{19}$, —CH($C_8H_{17}$)$C_{10}H_{21}$, and —CH($C_{10}H_{21}$)$C_{12}H_{25}$.

When the organic silicone compound is added into the magnetic layer of magnetic recording medium of an ordinary coating type, it is preferably present in an amount of 0.1 to 5% by weight, more preferably 0.5 to 3% by weight, based on the ferromagnetic particles. When the organic silicone compound is coated on the surface of the magnetic layer, it is preferably used in an amount of 2 to 50 mg/m² and preferably 2 to 30 mg/m².

When the amount of the organic silicone compound is over the above ranges, its concentration becomes too large at the surface of the magnetic layer, thereby causing problems such as adhesion, and when added into the magnetic layer, the binder in the magnetic layer is plasticized, thereby lowering durability.

When the amount of the organic silicone compound is below the above ranges, the content thereof becomes insufficient in the surface of the magnetic layer, leading to lack of desired effects.

Examples illustrating the preparation of the organic silicone compounds represented by formula (I) according to the present invention will hereinafter be described.

Namely, the organic silicone compounds can be synthesized using the following methods which are well known, as described in, for example, U.S. Pat. No. 4,135,016.

(1) Tetramethyl disiloxane [H(CH$_3$)$_2$Si]$_2$O, cyclic dimethylpolysiloxanes [(CH$_3$)$_2$SiO]$_n$, and cyclic methylhydrogenpolysiloxanes [H(CH$_3$)SiO]$_m$ are allowed to react with each other under equilibrium state to synthesize methylhydrogenpolysiloxanes represents by the following formula:

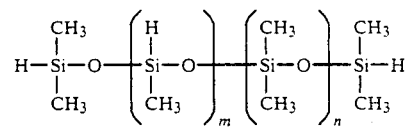

The synthesized methylhydrogenpolysiloxanes are then reacted with branched chain saturated or unsaturated fatty acids represented by the formula R$_1$COOH (wherein R$_1$ represents R, R', R", or unsaturated hydrocarbon groups which give rise to R, R', R" by hydrogenation) in the presence of metal catalysts (e.g., Ni, Pt, Pd, and Ru) to effect dehydrogenation as shown by the following reaction:

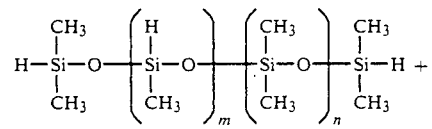

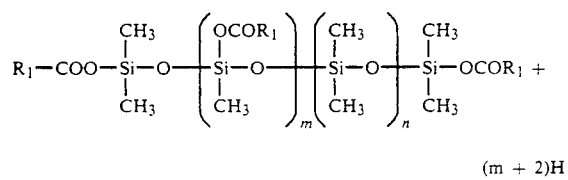

(2) Partial hydrolyzates of methyltrialkoxysilane:

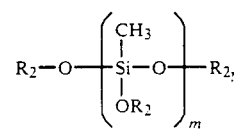

are allowed to react with cyclic dimethylpolysiloxanes [(CH$_3$)$_2$SiO]$_n$ under equilibrium state to synthesize methylalkoxypolysiloxanes represented by the following formula:

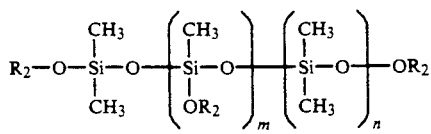

The synthesized methylalkoxypolysiloxanes are then reacted with branched chain saturated or unsaturated fatty acids represented by the formula $R_1COOH$ (wherein $R_1$ represents R, R', R", or unsaturated hydrocarbon groups which give rise to R, R', R" by hydrogenation) in the presence of acid catalysts (e.g., p-toluenesulfonic acid, sulfuric acid and hydrochloric acid) or alkali catalysts (e.g., sodium hydroxide and potassium hydroxide) to effect ester exchange reaction as shown by the following reaction:

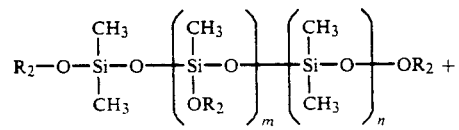

$(m + 2)R_1COOH \longrightarrow$

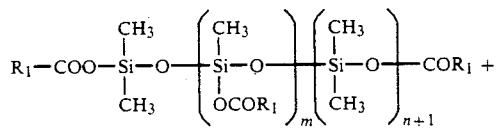

$(m + 2)R_2OH$ (3) A reaction between dimethyldichlorosilane $(CH_3)_2SiCl_2$ and partial hydrolyzates of methyltrichlorosilane $CH_3SiCl_3$, or between cyclic dimethylsiloxane $[(CH_3)_2SiO]_n$ and methyltrichlorosilane or its partial hydrolyzates is carried out under equilibrium state to obtain methylchloropolysiloxane having the following formula:

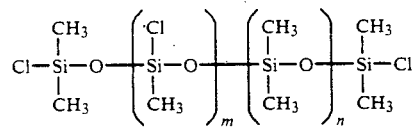

The methylchloropolysiloxane is then reacted with branched chain saturated or unsaturated fatty acids $R_1COOH$ (wherein $R_1$ is the same as defined above) in the presence of a dehydrochloric acid agent such as organic amines $(R_3)_3N$ (wherein $R_3$ represents a monovalent hydrocarbon group) as shown below.

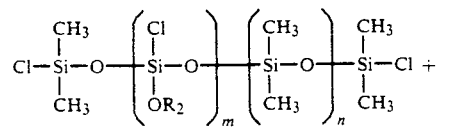

$(m + 2)R_1COOH + (m + 2)(R_3)_3N \longrightarrow$

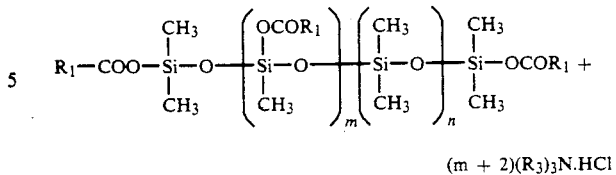

$(m + 2)(R_3)_3N \cdot HCl$

Among the above three methods, particularly preferred is method (1) which can be used to efficiently synthesize the organic silicone compounds represented by formula (I).

Representative examples of the compounds of formula (I) are shown in Table 1 below.

TABLE 1

(Organic Silicone Compounds)

$$R_a-\overset{O}{\underset{\|}{C}}-O-\underset{\underset{CH_3}{|}}{\overset{\overset{CH_3}{|}}{Si}}+O-\underset{\underset{CH_3}{|}}{\overset{\overset{OCOR_b}{|}}{Si}}\!\!\overset{}{)_m}\!\!+O-\underset{\underset{CH_3}{|}}{\overset{\overset{CH_3}{|}}{Si}}\!\!\overset{}{)_n}\!\!O-\underset{\underset{CH_3}{|}}{\overset{\overset{CH_3}{|}}{Si}}-O-\overset{O}{\underset{\|}{C}}-R_c \quad [A]$$

| Compound | $R_a$ | $R_b$ | $R_c$ | m* | n* |
|---|---|---|---|---|---|
| 1 | —CHC$_4$H$_9$<br>\|<br>C$_2$H$_5$ | Same as $R_a$ | Same as $R_a$ | 100 | 150 |
| 2 | —CHC$_8$H$_{17}$<br>\|<br>C$_6$H$_{13}$ | " | " | 20 | 60 |
| 3 | —CHC$_9$H$_{19}$<br>\|<br>C$_7$H$_{15}$ | " | " | 30 | 100 |
| 4 | —CHC$_{12}$H$_{25}$<br>\|<br>C$_{10}$H$_{21}$ | " | " | 50 | 50 |
| 5 | —CHC$_8$H$_{17}$<br>\|<br>C$_6$H$_{13}$ | " | " | 100 | 0 |
| 6 | —CHC$_{12}$H$_{25}$<br>\|<br>C$_{10}$H$_{21}$ | " | " | 50 | 250 |
| 7 | —CHC$_8$H$_{17}$<br>\|<br>C$_6$H$_{13}$ | —CHC$_{12}$H$_{25}$<br>\|<br>C$_{10}$H$_{21}$ | —CHC$_8$H$_{17}$<br>\|<br>C$_6$H$_{13}$ | 70 | 70 |
| 8 | —CHC$_{12}$H$_{25}$<br>\|<br>C$_{10}$H$_{21}$ | —CHC$_8$H$_{17}$<br>\|<br>C$_6$H$_{13}$ | —CHC$_{12}$H$_{25}$<br>\|<br>C$_{10}$H$_{21}$ | 60 | 120 |

*m, n: average value

Other lubricating agents can be used in combination with the organic silicone compounds according to the present invention.

Examples of such lubricating agents include saturated or unsaturated fatty acids (e.g., myristic acid, stearic acid, oleic acid), metallic soaps, fatty acid amides, fatty acid esters (e.g., various monoesters, sorbitan fatty acid esters, glycerol fatty acid esters, polybasic acid esters), higher aliphatic alcohols, monoalkyl phosphates, dialkyl phosphates, trialkyl phosphates, metal salts or ammonium salts of these phosphates, alkane phosphonic acids or salts thereof, alkylsulfric acid esters or salts thereof, alkane sulfonic acids or salts thereof, paraffins, other silicone oils, animal oils, vegetable oils, mineral oils, higher aliphatic amines, inorganic particles (e.g., graphite, silica, molybdenum disulfide, tungsten disulfide), resin particles (e.g., polyethylenes, polypropylenes, polyvinyl chlorides, ethylene/vinyl chloride copolymers, polytetrafluoroethylenes), alpha-olefin polymers, unsaturated aliphatic hydrocarbons which are liquid at ordinary temperature, fluorocarbons, fluorine-substituted ester compounds, and perfluoro alkyl polyethers.

The amount of such lubricating agents is about 1/10 to 2 times that of the organic silicone compounds of the present invention, though it varies according to the manner in which the lubricating agents are used.

In the present invention, the method for using the organic silicone compounds includes a method in which the magnetic layer is made to contain them, and a method in which the surface of the magnetic layer is coated with them. Examples of such coating method include a method in which the silicone compounds are dissolved in an organic solvent and then coated or sprayed on the surface of the magnetic layer followed by drying them; a method in which the silicone compounds are melted and then coated on the surface of the magnetic layer; a method in which a support is immersed in a solution comprising the silicone compounds dissolved in an organic solvent, thereby adsorbing them on the surface of the magnetic layer; and Langmuir-Blodgett's method.

The ferromagnetic particles used in the magnetic layer are not particularly limited with regard to their components (e.g., an iron oxide, a cobalt-containing iron oxide, an iron alloy, barium ferrite), their sizes, and a surface treatment thereof.

The shape of the ferromagnetic particles is not limited to a particular one. Generally, needle-like, granule-like, die-like, rice granule-like, or plate-like particles can be used. It is preferred that a crystallite size of the ferromagnetic particles is 45 nm or less as measured by X-ray diffraction from the standpoint of their electromagnetic characteristics.

Binders to form the magnetic layer are selected from conventional ones. Typical examples of such binders include vinyl chloride-vinyl acetate copolymers, copolymers of vinyl chloride, vinyl acetate and vinyl alcohol, maleic acid and/or acrylic acid, vinyl chloridevinylidene chloride copolymers, vinyl chloride-acrylonitrile copolymers, ethylene-vinyl acetate copolymers, cellulose derivatives such as nitrocellulose, acrylic resins, polyvinyl acetal resins, polyvinyl butyral resins, epoxy resins, phenoxy resins, polyurethane resins, and polycarbonate polyurethane resins. In order to further improve dispersibility and durability, polar groups are preferably introduced into the molecules of the above noted binders. Such polar groups include epoxy group, $CO_2H$, $OH$, $NH_2$, $SO_3M$, $OSO_3M$, $PO_3M_2$, and $OPO_3M_2$ (wherein M is hydrogen, alkali metal or ammonium, and they may be different from each other when a plurality of M are present in one group). The content of the polar groups preferably is in an amount of $10^{-6}$ to $10^{-4}$ equivalent per 1 g of the resin.

The above noted binders can be used alone or in combination, and are frequently cured using conventional isocyanate type crosslinking agents.

A binder which comprises an oligomer and a monomer of acrylic acid esters and is cured by irradiation can also be used in the present invention.

The materials for forming a non-magnetic support include resins such as polyesters (e.g., polyethylene terephthalate, polyethylene 2,6-naphthalate), polyolefins (e.g., polyethylene, polypropylene), cellulose derivatives (e.g., cellulose triacetate), polycarbonate, polyimide, and polyamide imide. Such resins may be metallized with metals such as aluminum.

The non-magnetic support generally has a thickness of 3 to 100 microns, particularly in the case of a magnetic tape it has a thickness of 3 to 20 microns, and in the case of a magnetic disk it has a thickness of 20 to 100 microns.

The binder content of the magnetic layer in the magnetic recording medium of the present invention generally is 10 to 70 parts by weight, preferably 20 to 40 parts by weight per 100 parts by weight of the ferromagnetic particles.

It is preferred that the magnetic layer according to the present invention contains inorganic particles having a Mohs' hardness of 5 or higher.

If the inorganic particles have a Mohs' hardness of 5 or higher, they can be used without any restriction. Examples of such inorganic particles having a Mohs' hardness of 5 or higher include $Al_2O_3$ (Mohs' hardness: 9), TiO (Mohs' hardness: 6), $TiO_2$ (Mohs' hardness: 6.5), $SiO_2$ (Mohs' hardness: 7), $SnO_2$ Mohs' hardness: 6.5), $Cr_2O_3$ (Mohs' hardness: 9), and alpha-$Fe_2O_3$ (Mohs' hardness: 5.5). These can be used alone or in combination.

Particularly preferred are inorganic particles having a Mohs' hardness of 8 or higher. When inorganic particles having a mohs' hardness of less than 5 are used, inorganic particles tend to fall from the magnetic layer, thereby causing head clogging while a tape is running, and running durability deteriorates.

The content of the inorganic particles generally is 0.1 to 20 parts by weight, preferably 1 to 10 parts by weight, per 100 parts by weight of the ferromagnetic particles.

It is preferred that the magnetic layer contains carbon black (particularly, carbon black having an average particle size of 10 to 300 nm (nanometer)), besides the above noted inorganic particles.

The method for preparing a magnetic recording medium of the present invention will be hereinafter illustrated.

A magnetic coating composition is prepared by mixing and kneading ferromagnetic particles, binder, the organic silicone compound of the present invention, and if necessary, fillers, and other additives with a solvent. The solvent can be one which is conventionally used for preparing a magnetic coating composition.

The method for mixing and kneading is not particularly limited, and the order of adding each component can optionally be determined.

Namely, there may be adopted a method in which binders, solvents, and ferromagnetic particles are mixed and kneaded in advance, and then a solution of a hardener is added thereto; or a method in which lubricating agents are finally added in a state of solution to the composition thus prepared.

Conventional additives such as dispersing agents, antistatic agents or lubricating agents or the like can be used when a magnetic coating composition is prepared.

Examples of dispersing agents include fatty acids having 12 to 22 carbon atoms, salts or esters of these fatty acids or those in which part of or all of the hydrogen of the compounds are replaced with fluorine atom(s), amides of these fatty acids, aliphatic amines, higher alcohols, polyalkyleneoxidealkylphosphoric acid esters, alkylphosphoric acid esters, alkylboric acid esters, sarcosines, alkylether esters, trialkylpolyolefins, oxy quaternary ammonium salts, and lecithin.

The dispersing agents are used in an amount of 0.1 to 10 parts by weight per 100 parts by weight of the ferromagnetic particles.

Examples of antistatic agents include electroconductive particles (e.g., carbon black, carbon black graft polymer), natural surface active agents (e.g., saponin), nonionic surface active agents (alkyleneoxides, glycerols, glycidols), cationic surface active agents (e.g., higher alkylamines, quaternary ammonium salts, salts of pyridine or heterocyclic compounds, phosphoniums, sulfoniums), anionic surface active agents having acid radicals (carboxylic acids, phosphoric acid, sulfuric acid esters, phosphoric acid esters), and amphoteric surface active agents (e.g., amino acids, amino sulfonic acids, sulfuric acid esters or phosphoric acid esters of amino alcohol). When the above noted electroconductive particles are used as antistatic agents, they are used in an amount of 0.1 to 10 parts by weight per 100 parts by weight of the ferromagnetic particles. When the above noted surface active agents are used as antistatic agents, they are used in an amount of 0.12 to 10 parts by weight per 100 parts by weight of the ferromagnetic particles.

Incidentally, the above mentioned additives such as dispersing agents, antistatic agents, and lubricating agents may have an effect other than that mentioned above for the particular agent. Namely, for example, it is probable that dispersing agents act as lubricating agents or antistatic agents. Therefore, the effects resulting from such additives are not restricted to those mentioned above. When additives having plural effects are used, it is preferred that the amount of them is determined by considering such plural effects.

The thus prepared coating composition is coated on the above described non-magnetic support. It can be coated directly or through an intermediate layer, such as an adhesive layer, on the non-magnetic support. Such intermediate layer includes a layer made of only an adhesive or a composite layer comprising non-magnetic particles such as carbon black dispersed in a binder, etc.

A binder in the intermediate layer which contains carbon black is optionally selected from various binders which are used in a magnetic layer. The carbon black preferably has a particle diameter of 10 to 50 nm. A weight ratio of binder to carbon black preferably is 100:10 to 100:150. When the intermediate layer is made of an adhesive layer, it is preferably 0.1 to 2 microns thick, and when the intermediate layer is made of a composite layer comprising non-magnetic particles, it is preferably 0.5 to 4 microns thick.

The intermediate layer may further contain lubricating agents which are the same as or different from those used in the magnetic layer.

The method for dispersing the ferromagnetic particles in the binder and the method for coating the magnetic coating composition on the support are disclosed in detail in JP-A-54-46011 and JP-A-54-21805, etc.

The thus coated magnetic layer has a dry thickness of generally about 0.5 to 10 microns, and preferably 0.7 to 6.0 microns.

When the magnetic recording medium is used in the shape of a tape, the magnetic layer thus provided on the non-magnetic support is subjected to magnetic orientation to orientate ferromagnetic particles contained therein, and then dried. On the other hand, when the magnetic recording medium is used in the shape of a disk, the magnetic layer is subjected to magnetic treatment to remove the anisotropy of magnetic properties, and then, if necessary, it is provided with a surface smoothing treatment.

The present invention will be illustrated in more detail by the following Examples and Comparative Examples. in all Examples, and Comparative Examples, all parts are by weight.

EXAMPLE

The following composition was mixed, kneaded and dispersed in a ball mill for 48 hours and then 5 parts of polyisocyanate was added thereto, and further mixed, kneaded and dispersed for 1 hour, and filtrated using a filter having an average pore diameter of 1 micron to prepare a magnetic coating composition. The thus obtained magnetic coating composition was coated, using a reverse roll, on a polyethylene terephthalate support having a thickness of 10 microns, in a dry thickness of 4.0 microns.

| Formulation of Magnetic Coating Composition | |
|---|---|
| Ferromagnetic particles | 100 parts |
| (Alloy of Fe 94%, Zn 4%, and Ni 2%; Coercive force: 1,500 Oe; Specific surface area: 54 m$^2$/g) | |
| Polyester polyurethane | 5 parts |
| (Weight average molecular weight: 40,000; Number average molecular weight: 25,000; on the average two SO$_3$Na groups per one molecule) | |
| Vinyl chloride/vinyl acetate/maleic anhydride copolymer | 12 parts |
| ("400X110A", produced by Nippon Zeon Co., Ltd.; Degree of polymerization: 400) | |
| Abrasive agent | 5 parts |
| (Alpha-alumina having an average particles size of 0.3 microns) | |
| Lubricating agent (See Table 2) | Amount shown in Table 2 |
| Oleic acid | 1 part |
| Carbon black | 2 parts |
| (Average particle size: 40 nm) | |
| Methyl ethyl ketone | 300 parts |

The non-magnetic support thus coated with the magnetic coating composition was provided with magnetic orientation with magnets of 3,000 gauss while the magnetic coating composition was undried. It was then dried, provided with super calendering treatment and slit to a 8 mm width to prepare a 8 mm video tape.

Using a VTR ("FUJIX-8", produced by Fuji Photo Film Co., Ltd.), signals at 7 MHz were recorded on the thus obtained video tapes and were playbacked. The output of 7 MHz was measured and is shown in terms of relative values based on a control tape (Sample 7) which was assigned to a value of 0 dB.

While a magnetic tape was wound around a stainless steel pole, with the surface of the magnetic layer contacted therewith at a contact angle of 180 degrees, the tensile strength (T2) necessary to rotate the stainless steel pole at a rotating speed rate of 3.3 cm/sec. with the tape having a tensile strength of 50 g (T1) was measured, the friction coefficient was calculated by the following equation.

$$\mu = 1/\pi \cdot ln(T2/T1)$$

The measurement of the friction coefficient was carried out under two conditions i.e., Condition A (at 20° C., 70% RH) and Condition B (at 5° C., 80% RH).

Physical properties of the tapes (samples 1-7) are shown in Table 2.

TABLE 2

| Sample No. | Organic Silicone Compound Kind | Amount (parts) | Output (dB) | μ Condition A (20° C., 70%) | μ Condition B (5° C., 70%) |
|---|---|---|---|---|---|
| 1 | No. 2 | 1.0 | 1 | 0.16 | 0.16 |
| 2 | No. 3 | 1.0 | 1 | 0.15 | 0.15 |
| 3 | No. 4 | 1.5 | 0 | 0.16 | 0.15 |
| 4 | Comparative Compound-1 | 1.0 | 0 | 0.17 | 0.25 |
| 5 | Comparative Compound-2 | 1.0 | 0 | 0.22 | 0.29 |
| 6 | Comparative Compound-3 | 1.0 | 0 | 0.23 | 0.29 |
| 7 | Comparative Compound-4 | 1.0 | 0 | 0.30 | 0.33 |

Comparative Compound-1:

$$R-\overset{O}{\overset{\|}{C}}-O-\underset{CH_3}{\overset{CH_3}{\underset{|}{Si}}}\left(O-\underset{CH_3}{\overset{CH_3}{\underset{|}{Si}}}\right)_m\left(O-\underset{CH_3}{\overset{OCOR}{\underset{|}{Si}}}\right)_nO-\underset{CH_3}{\overset{CH_3}{\underset{|}{Si}}}-O-\overset{O}{\overset{\|}{C}}-R$$

R: $-(CH_2)_{12}CH_3$
m: ave. 20
n: ave. 60

Comparative Compound-2:

$$R-\overset{O}{\overset{\|}{C}}-O-\underset{CH_3}{\overset{CH_3}{\underset{|}{Si}}}\left(O-\underset{CH_3}{\overset{CH_3}{\underset{|}{Si}}}\right)_nO-\underset{CH_3}{\overset{CH_3}{\underset{|}{Si}}}-O-\overset{O}{\overset{\|}{C}}-R$$

R: $-CH(C_7H_{15})C_9H_{19}$
n: ave. 100

Comparative Compound-3:

$$R-\overset{O}{\overset{\|}{C}}-O-\underset{CH_3}{\overset{CH_3}{\underset{|}{Si}}}\left(O-\underset{CH_3}{\overset{CH_3}{\underset{|}{Si}}}\right)_m\left(O-\underset{CH_3}{\overset{OCOR}{\underset{|}{Si}}}\right)_nO-\underset{CH_3}{\overset{CH_3}{\underset{|}{Si}}}-O-\overset{O}{\overset{\|}{C}}-R$$

R: $-(CH_2)_7CH=CH(CH_2)_7CH_3$
m: ave. 26$^{(cis)}$
n: ave. 60

Comparative Compound-4:
(KF-96-200CS, product of Shin-Etsu Chemical Co., Ltd.)

$$CH_3-\underset{CH_3}{\overset{CH_3}{\underset{|}{Si}}}\left(O-\underset{CH_3}{\overset{CH_3}{\underset{|}{Si}}}\right)_nO-\underset{CH_3}{\overset{CH_3}{\underset{|}{Si}}}-CH_3 \quad n: ave. 100$$

As clear from the results shown in Table 2, Samples 1 to 3 using the organic silicone compounds according to the present invention are high in reproduced output and are low in the friction coefficient even under both of Conditions A and B.

On the other hand, Samples 4 to 7 (comparative samples) using the conventional silicone compounds exhibit inferior reproduced outputs, and their friction coefficients are large particularly at low temperature and high humidities, namely, under Condition B.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support having thereon a magnetic layer comprising ferromagnetic particles dispersed in a binder, said magnetic layer containing an organic silicone compound represented by formula (I):

$$R-\overset{O}{\overset{\|}{C}}-O-\underset{CH_3}{\overset{CH_3}{\underset{|}{Si}}}\left(O-\underset{CH_3}{\overset{CH_3}{\underset{|}{Si}}}\right)_m\left(O-\underset{CH_3}{\overset{OCOR'}{\underset{|}{Si}}}\right)_nO-\underset{CH_3}{\overset{CH_3}{\underset{|}{Si}}}-O-\overset{O}{\overset{\|}{C}}-R'' \quad (I)$$

wherein R, R', and R'' each is independently selected from the group consisting of $-CH(C_6H_{13})C_8H_{17}$, $-CH(C_7H_{15})C_9H_{19}$, $-CH(C_8H_{17})C_{10}H_{21}$, and $-CH(C_{10}H_{21})C_{12}H_{25}$; m represents an integer of 1 to 100; n represents an integer of 0 to 250; $m+n \leq 300$; and $m \geq n/5$.

2. The magnetic recording medium of claim 1, wherein the compound of formula (I) is applied to the surface of the magnetic layer.

3. The magnetic recording medium of claim 2, wherein the compound of formula (I) is present in an amount of 2 to 50 mg/m$^2$.

4. The magnetic recording medium of claim 1, wherein the compound of formula (I) is dispersed in the magnetic layer.

5. The magnetic recording medium of claim 4, wherein the compound of formula (I) is present in an amount of 0.1 to 5 parts by weight per 100 parts by weight of the ferromagnetic particles.

6. The magnetic recording medium of claim 1, wherein the binder contained in the magnetic layer is present in an amount of 10 to 70 parts by weight per 100 parts by weight of the ferromagnetic particles.

7. The magnetic recording medium of claim 1, wherein the binder is selected from the group consisting of a thermoplastic resin, a thermosetting resin, a reactive binder resin and a mixture containing at least two thereof.

8. The magnetic recording medium of claim 1, wherein the binder contains a polar group.

* * * * *

UNITED STATES PATENT AND TRADEMARK OFFICE
CERTIFICATE OF CORRECTION

PATENT NO. : 5,051,318

DATED : September 24, 1991

INVENTOR(S) : NISHIKAWA, et al.

It is certified that error appears in the above-identified patent and that said Letters Patent is hereby corrected as shown below:

On the title page, item [54], please delete the word "CHAW" in the title and insert -- CHAIN --; and On the title page, item [22], delete "Oct. 18, 1999" and insert the correct filing date of -- Oct. 18, 1989 --.

Signed and Sealed this

Sixteenth Day of March, 1993

Attest:

STEPHEN G. KUNIN

Attesting Officer

Acting Commissioner of Patents and Trademarks